US008927132B2

(12) United States Patent
Kang et al.

(10) Patent No.: US 8,927,132 B2
(45) Date of Patent: Jan. 6, 2015

(54) RECHARGEABLE BATTERY PACK

(75) Inventors: Moon-Gil Kang, Yongin-si (KR); Jung-Seok An, Yongin-si (KR); Jin-Hwan Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 136 days.

(21) Appl. No.: 13/586,709

(22) Filed: Aug. 15, 2012

(65) Prior Publication Data

US 2013/0059484 A1 Mar. 7, 2013

(30) Foreign Application Priority Data

Sep. 2, 2011 (KR) ........................ 10-2011-0088785

(51) Int. Cl.
*H01M 2/20* (2006.01)
*H01R 13/11* (2006.01)
*H01R 13/74* (2006.01)

(52) U.S. Cl.
CPC ............ *H01R 13/113* (2013.01); *H01R 13/741* (2013.01)
USPC ............ 429/123; 429/178; 429/179; 429/211

(58) Field of Classification Search
USPC .................................. 429/123, 211, 178, 179
See application file for complete search history.

(56) References Cited

U.S. PATENT DOCUMENTS

| | | | | |
|---|---|---|---|---|
| 7,575,488 | B2 | 8/2009 | Lee et al. | |
| 2006/0170394 | A1* | 8/2006 | Ha et al. | 320/107 |
| 2010/0209743 | A1* | 8/2010 | Koh et al. | 429/7 |
| 2011/0039130 | A1 | 2/2011 | Baek et al. | |

FOREIGN PATENT DOCUMENTS

| | | |
|---|---|---|
| JP | 2002-056834 | 2/2002 |
| JP | 2005-285680 | 10/2005 |
| JP | 2007-73511 | 3/2007 |
| KR | 10-2007-0080868 | 8/2007 |
| KR | 10-2008-0003478 | 1/2008 |
| KR | 10-2009-0064069 | 6/2009 |
| KR | 10-2009-0064902 | 6/2009 |
| KR | 10-2011-0059284 | 6/2011 |

OTHER PUBLICATIONS

Patent Abstracts of Japan and English Translation of JP 2007-73511 (10 sheets).
KIPO Office action dated Dec. 21, 2012, for Korean priority Patent application 10-2011-0088785, (5 pages).
Patent Abstracts of Japan, and English machine translation of Japanese Publication 2005-285680 listed above, (16 pages).
KIPO Notice of Allowance dated Nov. 28, 2013, for Korean priority Patent application 10-2011-0088785, (5 pages).
Patent Abstracts of Japan, and English machine translation of Japanese Publication 2002-056834 dated Feb. 22, 2002, listed above, (12 pages).

* cited by examiner

*Primary Examiner* — Stewart Fraser
*Assistant Examiner* — Olatunji Godo
(74) *Attorney, Agent, or Firm* — Christie, Parker & Hale, LLP

(57) ABSTRACT

A rechargeable battery pack including: a cell pack including at least one unit cell; a protection circuit module including a printed circuit board including a protection circuit of the cell pack; a connection member inserted in a through hole of the printed circuit board and electrically connected to the printed circuit board; and a connection tab electrically connected to the cell pack inserted into and electrically connected to the connection member.

13 Claims, 8 Drawing Sheets

RECHARGEABLE BATTERY PACK

CROSS-REFERENCE TO RELATED APPLICATION

This application claims priority to and the benefit of Korean Patent Application No. 10-2011-0088785, filed on Sep. 2, 2011 in the Korean Intellectual Property Office, the entire content of which is incorporated herein by reference.

BACKGROUND

1. Field

Aspects of embodiments of the present invention relate to a rechargeable battery pack.

2. Description of the Related Art

With the increased technology development and demand for mobile devices, the demand for rechargeable batteries as an energy source has also increased. The rechargeable battery may be used as a single-cell type or a pack type electrically connecting a plurality of cells with each other, depending on an apparatus using the rechargeable battery. For example, a typical rechargeable battery pack includes a cell pack formed by connecting a plurality of cells, a protection circuit module (PCM) protecting the cell pack, and a conductive connection tab connecting the cell pack and the protection circuit module.

Typically, the connection tab is welded to the cell pack at one side, and the other side of the connection tab is inserted to a printed circuit board of the protection circuit module and then welded or soldered to a land of the printed circuit board. A welding or soldering process requires a highly skilled technique, and also requires a space for treatment of iron. In addition, when the cell pack receives physical impact during a connection process of the connection tab and the protection circuit board, fire or explosion may occur due to an electrical short.

For example, soldering causes a temperature increase such that an integrated circuit and circuit parts on the protection circuit module may be damaged, and interference between solder and a case may occur during assembling due to the height of the solder. The size of a land in the printed circuit board should be assured due to dispersion of the shape of soldering, and accordingly freedom in design of the circuit board is adversely affected. Circuit parts on the protection circuit module may be damaged due to solder and arsenic acid of flux. In addition, the oxidized flux may be permeated between a conductive connection tab and a solder ball, thereby causing a failure in soldering, and an insufficient temperature of the land may cause cold soldering between the land of the printed circuit board and the connection tab.

The above information disclosed in this Background section is provided only for enhancement of understanding of the background of the described technology and therefore it may contain information that does not form the prior art that is already known in this country to a person of ordinary skill in the art.

SUMMARY

According to an exemplary embodiment of the present invention, a rechargeable battery pack has an improved and simplified connection between a protection circuit module and a connection tab and improves conductivity.

According to an exemplary embodiment of the present invention, a rechargeable battery pack includes: a cell pack including at least one unit cell; a protection circuit module including a printed circuit board including a protection circuit of the cell pack; a connection member inserted in a through hole of the printed circuit board and electrically connected to the printed circuit board; and a connection tab electrically connected to the cell pack inserted into and electrically connected to the connection member.

The printed circuit board may include a land at a periphery of the through hole, and the connection member may be electrically connected to the printed circuit board at the land.

The connection member may be integrally formed and include a body portion electrically connected to the connection tab, and a guide portion and a supporting portion that are connected to the body portion and electrically connected to the printed circuit board at the land. The connection member may be integrally formed by cutting and bending a conductive plate.

The body portion may be inserted in the through hole, the guide portion may be bent to an outer side of the body portion for guiding insertion of the body portion into the through hole and limiting separation of the body portion from the printed circuit board, and may electrically contact a first side of the printed circuit board at the land, and the supporting portion may be bent to the outer side of the body portion and facing the guide portion for limiting insertion of the body portion into the through hole, and may electrically contact a second side of the printed circuit board at the land, the second side being opposite the first side. In one embodiment, the first side of the printed circuit board is a lower side thereof, and the second side of the printed circuit board is an upper side thereof. In another embodiment, the first side of the printed circuit board is an upper side thereof, and the second side of the printed circuit board is a lower side thereof.

The guide portion and the supporting portion may be formed as a pair, and may be provided at two or three locations along a perimeter of the body portion.

The guide portion may be bent with a slope at a side of the body portion to elastically support the printed circuit board, and the supporting portion may be perpendicularly bent at the side of the body portion and may be in surface contact with the land of the printed circuit board.

The through hole may have a generally quadrangle shape, the printed circuit board may further include a protrusion protruding from a side of the through hole toward a center of the through hole, and the body portion may include a groove extending along an insertion direction and corresponding to the protrusion.

The body portion may include: inner and outer plates forming a double-layered portion by being bent in a circumference direction and extended in a length direction and respectively forming inner and outer sides of the double-layered portion; a base plate at a side opposite the double-layered portion; and an elastic plate facing the inner plate by being bent inward from the base plate and closely attaching the inserted connection tab to the inner plate by elastically supporting the inserted connection tab.

The elastic plate may include a curved line portion connected in a curved line to the base plate and providing an elastic force, an inclined portion bent with a slope to the curved line and inducing insertion of the connection tab, and a parallel portion bent from the inclined portion and extending in parallel with the inner plate.

The parallel portion may include a dimple convexly protruding toward the inner plate.

The connection tab may include a convex line convexly protruding toward the inner plate.

The connection member may be coupled to the printed circuit board in an inserted manner from above the printed circuit board, and the connection tab may be coupled to the connection member in an inserted manner from below the printed circuit board.

The connection member may be coupled to the printed circuit board in an inserted manner from below the printed circuit board, and the connection tab may be coupled to the connection member in an inserted manner from below the printed circuit board.

The body portion may be inserted to the through hole and the guide portion may guide insertion of the body portion to the through hole by being bent to the outer side of the body portion, limit separation of the body portion by supporting the printed circuit board after the insertion of the body portion, and electrically contact the land at the upper side of the printed circuit board.

The supporting portion may limit insertion of the body portion by being bent to be faced with the guide portion and electrically contact the land at the bottom side of the printed circuit board.

According to an exemplary embodiment of the present invention, the connection tab, the connection member, and the protection circuit module are electrically connected by coupling the connection member to the protection circuit module in an inserted manner and coupling the connection tab to the connection member in an inserted manner such that connection between the protection circuit module and the connection tab can be simplified.

As described, according to an aspect of embodiments of the present invention, an electrical connection can be realized by the coupling method such that problems that may occur due to welding or soldering are eliminated or substantially eliminated. Further, a processing time is shortened, and manufacturing costs are reduced because facilities and materials (e.g., lead and flux) for welding and soldering are not required.

BRIEF DESCRIPTION OF THE DRAWINGS

The accompanying drawings, together with the specification, illustrate some exemplary embodiments of the present invention, and, together with the description, serve to explain aspects and principles of the present invention.

DESCRIPTION OF REFERENCE NUMERALS INDICATING SOME ELEMENTS IN THE DRAWINGS

Figure 1:
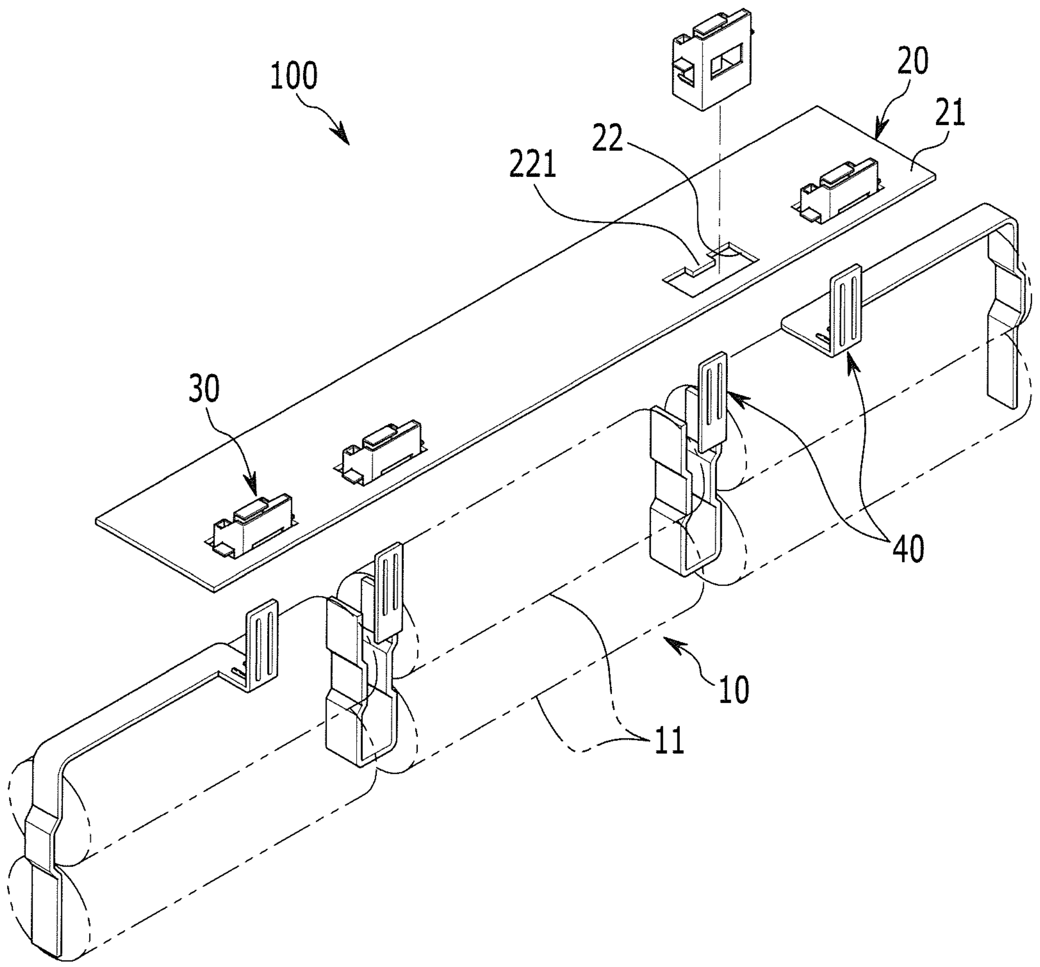
FIG. 1 is an exploded perspective view of a rechargeable battery pack according to an exemplary embodiment of the present invention.

| | |
|---|---|
| 10: cell pack | 11: unit cell |
| 20: protection circuit module | 21: printed circuit board |
| 22: through hole | 23: land |
| 30, 530: connection member | 31, 531: body portion |
| 32, 532: guide portion | 33, 533: supporting portion |
| 40: connection tab | 41: convex line |
| 100, 200: rechargeable battery pack | 221: protrusion |
| 311: groove | 312: outer plate |
| 313: inner plate | 314: base plate |
| 315: elastic plate | 316: curved line portion |
| 317: inclined portion | 318: parallel portion |
| 319: dimple | |

DETAILED DESCRIPTION

The present invention is described more fully hereinafter with reference to the accompanying drawings, in which some exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is an exploded perspective view of a rechargeable battery pack 100 according to an exemplary embodiment of the present invention. Referring to FIG. 1, the rechargeable battery pack 100 according to an exemplary embodiment includes a cell pack 10 formed of rechargeable batteries, a protection circuit module 20 protecting the cell pack 10, a connection member 30 electrically connected to the protection circuit module 20, and a connection tab 40 electrically connecting the cell pack 10 and the connection member 30.

The cell pack 10 includes a unit cell 11 as a rechargeable battery, and may be formed of one unit cell 11 or a plurality of unit cells 11 coupled in parallel or series for providing a desired output power. In one exemplary embodiment, the cell pack 10 is formed by coupling pairs of unit cells 11 in parallel and coupling the pairs of parallelly coupled unit cells 11 in series.

The unit cell 11 may be formed, for example, of an electrode assembly formed by spirally winding a positive electrode and a negative electrode with a separator interposed therebetween, a case housing an electrolyte solution and the electrode assembly, and a cap assembly fastened to the case in a sealed structure and electrically connected to the electrode assembly, and the unit cell 11 iteratively performing charging and discharging operations (not shown).

The protection circuit module 20 is provided with a protection circuit formed by installing circuit elements on a printed circuit board 21 for protection of the cell pack 10 from overcharge, over-discharge, overcurrent, and a short circuit. The printed circuit board 21 is provided with a through hole 22 corresponding to the connection member 30. The through hole 22 enables the printed circuit board 21 and the cell pack 10 to be connected with each other through the connection member 30 and the connection tab 40.

Further, as shown in FIG. 1, the cell pack 10 may be extended and the connection tab 40 may be bent, and the through hole 22 may be disposed in plural along a length direction of the printed circuit board 21. In one embodiment, as shown in FIG. 1, four through holes 22 are provided in the printed circuit board 21. In this case, the printed circuit board 21 can be stably supported by four connection members 30 coupled with the printed circuit board 21 and the connection tabs 40 respectively connected to the four connection members 30.

The connection member 30 is coupled by insertion into the through hole 22 of the printed circuit board 21 and is electrically connected to the printed circuit board 21, and is further capable of receiving the inserted connection tab 40 with a contact structure. The connection member 30, in one embodiment, is coupled to the through hole 22 by elastic deformation and restoration action such that the connection member 30 maintains electrical connection with the printed circuit board 21. Thus, the connection member 30 can couple the connection tab 40 to the printed circuit board 21 without using a welding or soldering process.

The connection tab 40 is electrically fixed to the cell pack 10 at one side, and the other side of the connection tab 40 is electrically coupled to the connection member 30 in an inserted manner. In one embodiment, the connection member 30 maintains electrical connection with the connection tab 40 by elastic deformation and pressure action. Thus, the connection tab 40 is electrically connected to the printed circuit board 21 through the connection member 30. Therefore, a welding or soldering process can be omitted. Further, the other side of the connection tab 40 may be fixed to the cell pack 10, such as by welding.

The connection tab 40 may have any of various structures depending on its location in the cell pack 10. For example, a connection tab 40 disposed between linearly connected unit cells 11 may be bent having structures on opposite sides that correspond to each other and are directly coupled to the unit cells 11 by welding the unit cells 11 respectively to both sides (refer to two connection tabs in center in FIG. 1). Also, for example, connection tabs 40 at outermost sides of the unit cells 11 may be respectively bent and may be welded with the unit cell 11 at one side thereof and then extended to the printed circuit board 21 (refer to two connection tabs at outermost sides in FIG. 1).

Figure 2:
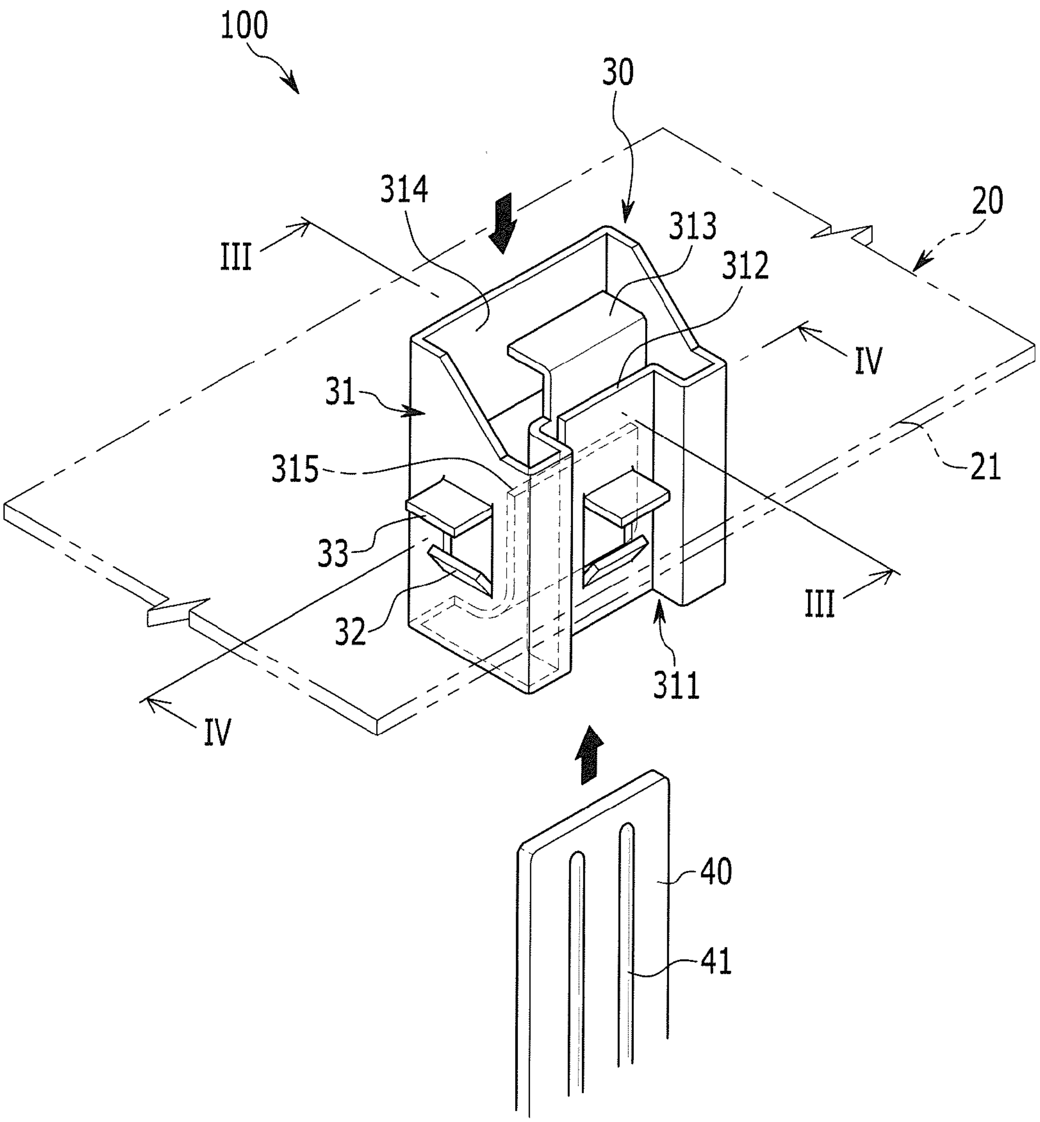
FIG. 2 is a perspective view illustrating a process of assembling a connection member and a connection tab to a protection circuit module of the rechargeable battery pack of FIG. 1.
Figure 3:
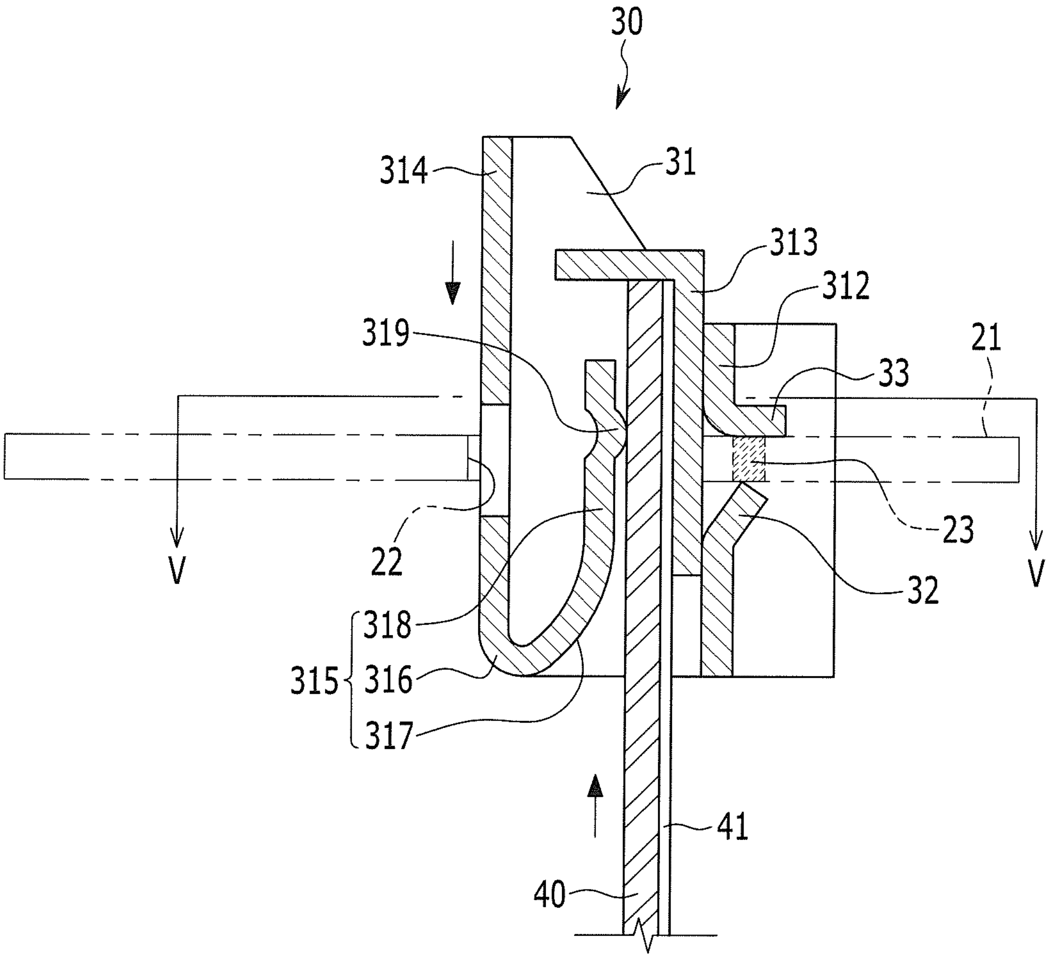
FIG. 3 is a cross-sectional view of the connection member, the connection tab, and the protection circuit module of FIG. 2 shown in an assembled state, taken along the line III-III.

FIG. 2 is a perspective view of a process of assembling the connection member 30 and the connection tab 40 to the protection circuit module 20, and FIG. 3 is a cross-sectional view of the connection member 30, the connection tab 40, and the protection circuit module 20 shown in an assembled state, taken along the line III-III of FIG. 2. A connection structure between the connection member 30 and the protection circuit module 20 is described below.

Referring to FIG. 2 and FIG. 3, the printed circuit board 21 forms a land 23 at a periphery of the through hole 22 for electrical connection with the connection member 30. For example, the land 23, in one embodiment, may be formed in a copper foil pattern for realization of the electrical connection in the printed circuit board 21, and provides an electrical contact area with the connection member 30.

In one embodiment, the connection member 30 is integrally formed, such as by cutting and bending a conductive plate, and includes a body portion 31, a guide portion 32, and a supporting portion 33. The conductive plate may be bent to form a perimeter or circumference of the body portion 31. The body portion 31 extends along one direction (e.g., the up and down direction of FIG. 2) and is inserted into the through hole 22 of the printed circuit board 21 along the extended direction. In one embodiment, the connection tab 40 is inserted to the body portion 31 and is thereby electrically connected to the connection member 30.

Since the guide portion 32 and the supporting portion 33 are connected (e.g., integrally connected) to the body portion 31, and the body portion 31 is inserted into the through hole 22, the guide portion 32 and the supporting portion 33 contact the land 23 such that the body portion 31 is electrically connected to the printed circuit board 21.

The guide portion 32, in one embodiment, is bent toward the outside of the body portion 31 and guides insertion of the body portion 31 into the through hole 22 in an insertion direction (e.g., from above to below), and after insertion of the body portion 31, the guide portion 32 restricts separation of the body portion 31 from the printed circuit board 21 in a direction (e.g., below to above) opposite the insertion direction by supporting the printed circuit board 21 in a direction (e.g., from below). In one embodiment, the guide portion 32 electrically contacts the land 23 at the bottom side of the printed circuit board 21.

The supporting portion 33, in one embodiment, is bent toward the outside of the body portion 31 at a side of (e.g. above) the guide portion 32 so as to face the guide portion 32, and restricts the body portion 31 from being inserted beyond a certain point by supporting the body portion 31 when the body portion 31 is inserted. In one embodiment, the supporting portion 33 electrically contacts the land 23 at the upper side of the printed circuit board 21.

Interposing the printed circuit board 21 between the guide portion 32 and the supporting portion 33, the guide portion 32 elastically supports a side (e.g., a bottom side) of the printed circuit board 21 by being bent at an angle (e.g., at an inclined angle) at a side of the body portion 31, and the supporting portion 33 supports an opposite side (e.g., an upper side) of the printed circuit board 21 through surface contact by being bent (e.g., perpendicularly bent) at the side of the body portion 31. Accordingly, the guide portion 32, the land 23, and the supporting portion 33 can form and maintain a stable electrical contact. That is, the connection member 30 may be electrically connected to the land 23 of the printed circuit board 21 in an inserted manner.

The guide portion 32 and the supporting portion 33, in one embodiment, are formed as a pair facing each other, and further may be formed as two, three, or more pairs at respective locations along the perimeter or circumference of the body portion 31 so as to more stably couple and connect the connection member 30 on the printed circuit board 21.

Referring back to FIG. 1, in one embodiment, the through hole 22 formed in the printed circuit board 21 is formed having a shape of a quadrangle, and the printed circuit board 21 has a protrusion 221 protruding toward a center of the through hole 22 from one side thereof. Referring to FIG. 2, in one embodiment, the body portion 31 inserted into the through hole 22 has a groove 311 along the insertion direction corresponding to the protrusion 221. The protrusion 221 and the groove 311 can further effectively guide insertion of the connection member 30 into the through hole 22.

A connection structure between the connection member 30 and the connection tab 40 is described below. Referring to FIG. 2 and FIG. 3, the body portion 31, in one embodiment, includes an outer plate 312, an inner plate 313, a base plate 314, and an elastic plate 315, which may be formed by bending a conductive plate.

The outer plate 312 and the inner plate 313, in one embodiment, are bent along a perimeter or circumference direction and extended in a lengthwise direction while forming a double-layered portion by being overlapped with each other, and respectively form an outer side and an inner side of the double-layered portion. In one embodiment, the inner plate 313 is formed by bending an end portion that is proximate an end of the connection tab 40 in the insertion direction inwardly toward the base plate 314 to restrict a degree of insertion of the connection tab 40. The base plate 314 is formed at the opposite side of the double-layered portion and faces the inner plate 313. The elastic plate 315 is bent from a side (e.g., a bottom side) of the base plate 314 with an elastic structure and faces the inner plate 313 while being separated from the inner plate 313.

In one embodiment, as shown in FIG. 2, the body portion 31 is made up of the outer plate 312, the base plate 314, and the inner plate 313 in sequence along the perimeter or circumference direction, and the elastic plate 315 connected to the base plate 314 is provided facing the inner plate 313 within the perimeter or circumference.

When the connection tab 40 is inserted into the body portion 31, the elastic plate 315 elastically supports the connection tab 40 such that the connection tab 40 closely contacts the inner plate 313. That is, the connection tab 40 is electrically connected to the body portion 31 through the elastic plate 315 and the inner plate 313 that respectively closely contact opposite sides of the connection tab 40. In one embodiment, the insertion of the connection tab 40 is complete when reaching the inwardly bent end portion of the inner plate 313.

In one embodiment, the elastic plate 315 includes a curved line portion 316 providing elastic force by being bent in a curved line from the base plate 314, an inclined portion 317 inclined with a slope from the curved line portion 316 to guide insertion of the connection tab 40, and a parallel portion 318 bent from the inclined portion 317 and extending in parallel with the inner plate 313.

The elastic plate 315, in one embodiment, has a dimple 319 convexly protruding toward the inner plate 313 along the parallel portion 318 to press the connection tab 40 such that the connection tab 40 and the inner plate 313 more closely contact each other, thereby stabilizing the electrical connection structure.

Figure 4:
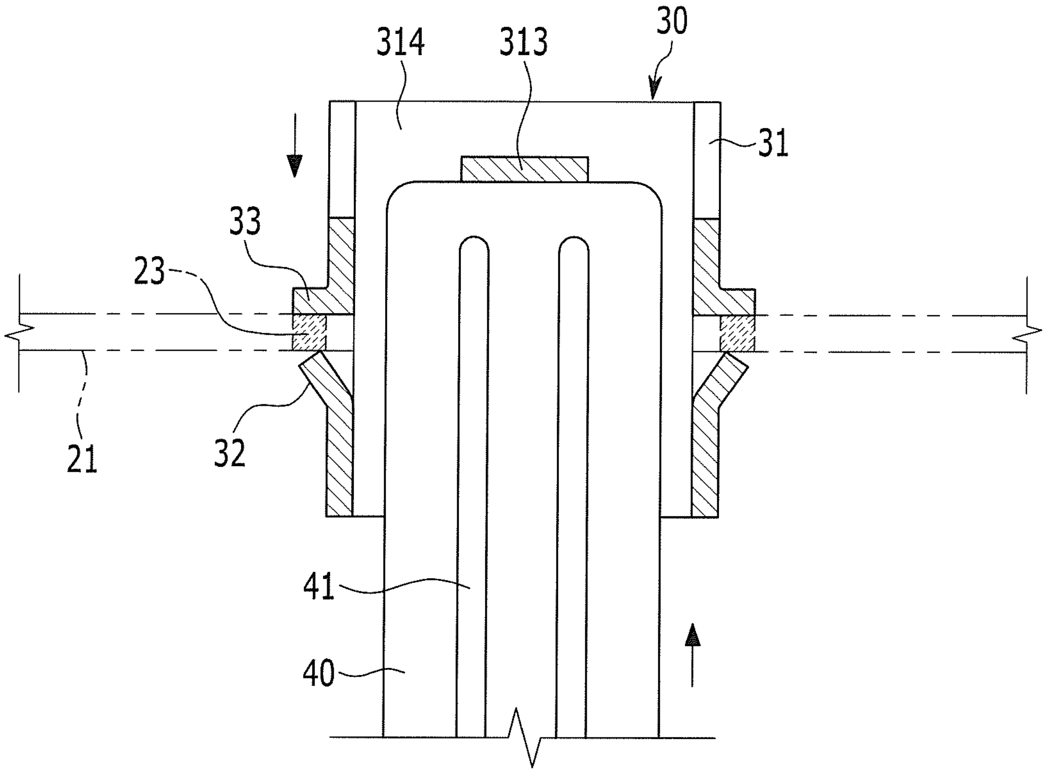
FIG. 4 is a cross-sectional view of the connection member, the connection tab, and the protection circuit module of FIG. 2 shown in an assembled state, taken along the line IV-IV.
Figure 5:
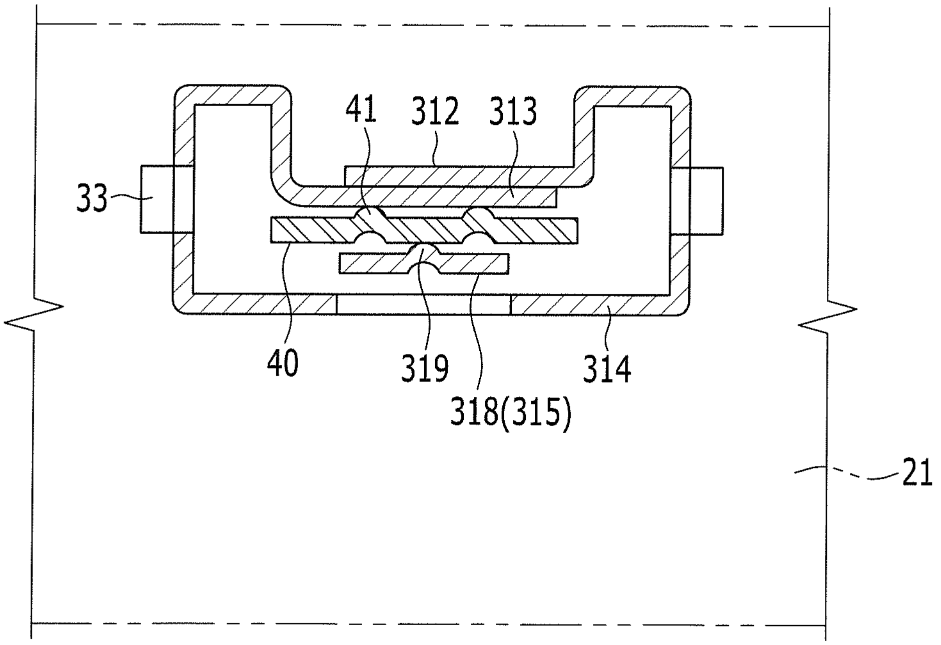
FIG. 5 is a cross-sectional view of the connection member, the connection tab, and the protection circuit module of FIG. 2 shown in an assembled state, taken along the line V-V of FIG. 3.

FIG. 4 is a cross-sectional view of the connection member 30, the connection tab 40, and the protection circuit module 20 shown in an assembled state, taken along the line IV-IV of FIG. 2, and FIG. 5 is a cross-sectional view of the connection member 30, the connection tab 40, and the protection circuit module 20 shown in an assembled state, taken along the line V-V of FIG. 3. Referring to FIG. 4 and FIG. 5, the connection tab 40 is connected to the cell pack 10 and then protruded toward the protection circuit module 20 such that the connection tab 40 is inserted between the elastic plate 315 and the inner plate 313 of the connection member 30.

The connection tab 40, in one embodiment, includes a convex line 41 formed convexly toward the inner plate 313 along a portion of the connection tab 40 that is inserted into the connection member 30. In one embodiment, two convex lines 41 are formed in parallel to each other and closely contact the inner plate 313 so as to further stabilize the electrical connection structure.

As described, in the rechargeable battery pack 100 according to an exemplary embodiment, the connection member 30 is moved in a direction from above to below the printed circuit board 21 and then coupled to the through hole 22 in an inserted manner, and the connection tab 40 is moved in a direction from below to above the printed circuit board 21 and then coupled to the connection member 30 in an inserted manner.

That is, the connection tab 40 of the cell pack 10 is coupled to the printed circuit board 21 through the connection member 30 and is thereby electrically connected to the printed circuit board 21. According to an embodiment of the present invention, since a process of welding or soldering is omitted, a processing time for connection of the connection tab 40 and the protection circuit module 20 is reduced, the process is simplified, and problems which may be caused by a welding or soldering process are avoided.

A rechargeable battery pack according to another exemplary embodiment of the present invention is described below, and descriptions of the same or similar elements as those described above with respect to the rechargeable battery pack 100 are omitted, and only different elements are described.

Figure 6:
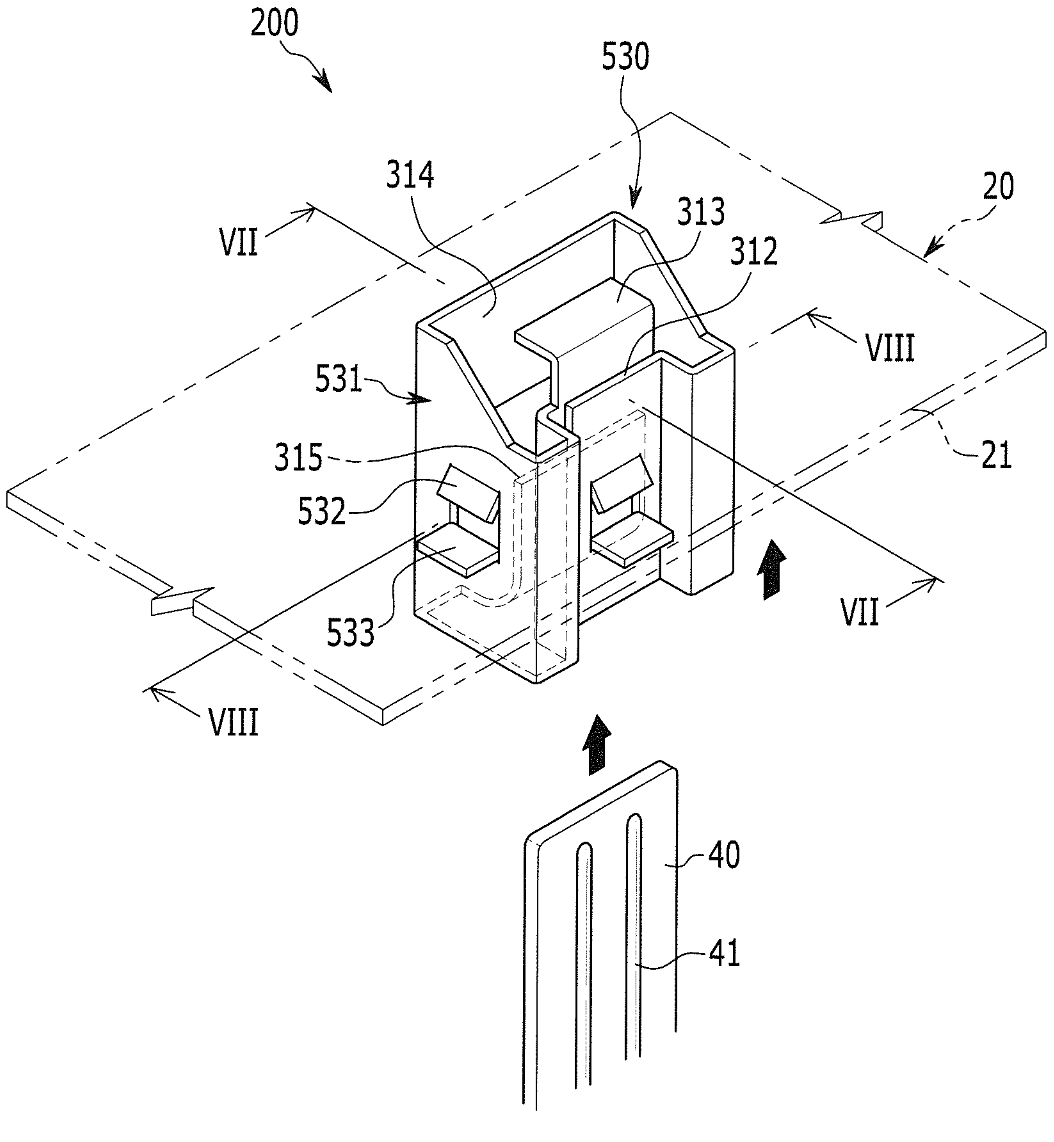
FIG. 6 is a perspective view illustrating a process of assembling a connection member and a connection tab to a protection circuit module of a rechargeable battery pack according to another exemplary embodiment of the present invention.
Figure 7:
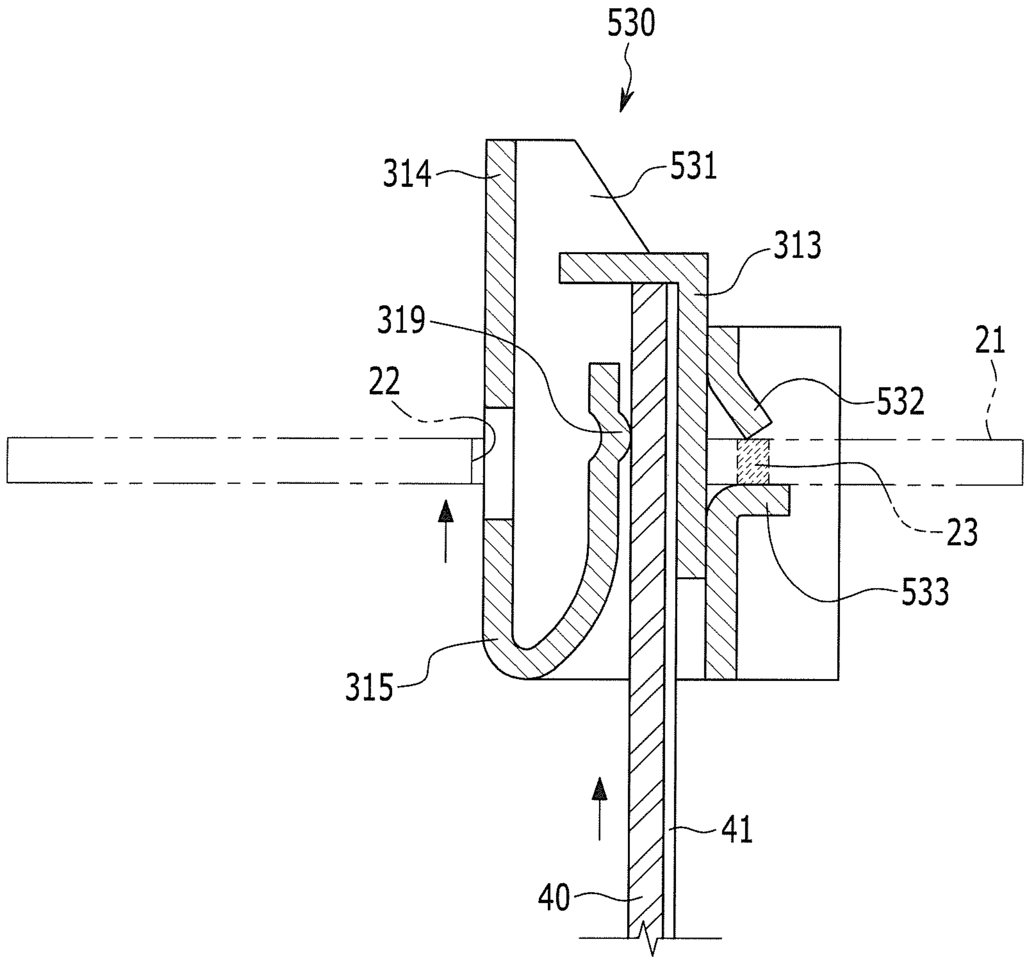
FIG. 7 is a cross-sectional view of the connection member, the connection tab, and the protection circuit module of FIG. 6 shown in an assembled state, taken along the line VII-VII.

FIG. 6 is a perspective view illustrating a process of assembling a connection member 530 and the connection tab 40 to the protection circuit module 20 in a rechargeable battery pack 200 according to another exemplary embodiment of the present invention; FIG. 7 is a cross-sectional view of the connection member 530, the connection tab 40, and the protection circuit module 20 shown in an assembled state, taken along the line VII-VII of FIG. 6; and FIG. 8 is a cross-sectional view of the connection member 530, the connection tab 40, and the protection circuit module 20 shown in an assembled state, taken along the line VIII-VIII of FIG. 6.

Figure 8:
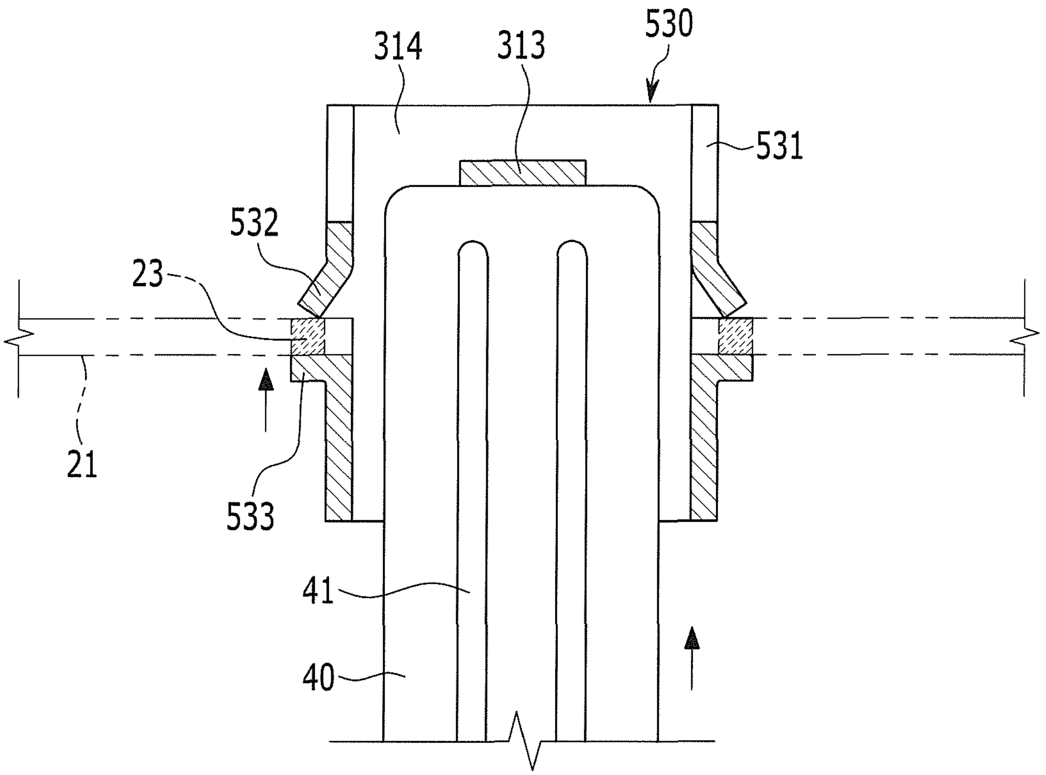
FIG. 8 is a cross-sectional view of the connection member, the connection tab, and the protection circuit module of FIG. 6 shown in an assembled state, taken along the line VIII-VIII.

Referring to FIG. 6 to FIG. 8, in the rechargeable battery pack 200 according to another exemplary embodiment, the connection member 530 is moved in a direction from below to above the printed circuit board 21 and then coupled to the through hole 22 in an inserted manner, and the connection tab 40 is moved in the direction from below to above the printed circuit board 21 and coupled to a body portion 531 of the connection member 530 in an inserted manner.

In the rechargeable battery pack 200, the insertion direction of the connection tab 40 is the same as that of the connection member 530, and the connection member 530 can thereby be prevented or substantially prevented from having a force that tends to be separated from the printed circuit board 21 due to an insertion force of the connection tab 40, and can further reinforce an insertion force of the connection member 530 and the printed circuit board 21. That is, in the rechargeable battery pack 200, failures in insertion and coupling of the printed circuit board 21, the connection member 530, and the connection tab 40 may be further effectively prevented.

In the connection member 530, a guide portion 532 is bent to an outer direction of the body portion 531 to guide insertion of the body portion 531 in a direction from below to above the through hole 22, and after the insertion of the body portion 531, the guide portion 532 limits separation of the body portion 531 to an opposite direction (i.e. from above to below) of the insertion direction from the printed circuit board 21 by supporting the printed circuit board 21 from above. In one embodiment, the guide portion 532 electrically contacts the land 23 at the upper side of the printed circuit board 21.

A supporting portion 533 is bent to the outer direction of the body portion 531 so as to be faced below the guide portion 532 and limits a degree of insertion in the upward direction by supporting the body portion 531 when the body portion 531 is being inserted. In one embodiment, the supporting portion 533 electrically contacts the land 23 at the bottom side of the printed circuit board 21.

Interposing the printed circuit board 21 between the guide portion 532 and the supporting portion 533, the guide portion 532 elastically supports the upper side of the printed circuit board 21 by being bent (e.g., bent with a slope) at a side of the body portion 531, and the supporting portion 533 supports the bottom side of the printed circuit board 21 through surface contact by being bent (e.g., perpendicularly bent) at the side of the body portion 531. Accordingly, in one embodiment, the guide portion 532, the land 23, and the supporting portion 533 form and maintain robust electrical contact. That is, the connection member 530 is electrically coupled with the printed circuit board 21 in an inserted manner.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery pack comprising:

a cell pack comprising at least one unit cell;

a protection circuit module comprising a printed circuit board including a protection circuit of the cell pack;

a connection member inserted in a through hole of the printed circuit board and electrically connected to the printed circuit board; and a connection tab electrically connected to the cell pack and electrically connected to the connection member, wherein the printed circuit board comprises a land at a periphery of the through hole, and the connection member is electrically connected to the printed circuit board at the land, the connection member is integrally formed and comprises a body portion electrically connected to the connection tab, and a guide portion and a supporting portion that are connected to the body portion and electrically connected to the printed circuit board at the land, and wherein the body portion is inserted in the through hole of the printed circuit board, and the connection tab is inserted in the body portion, and wherein the body portion is inserted in the through hole, the guide portion is bent to an outer side of the body portion for guiding insertion of the body portion into the through hole and limiting separation of the body portion from the printed circuit board, and electrically contacts a first side of the printed circuit board at the land, and the supporting portion is bent to the outer side of the body portion and facing the guide portion for limiting insertion of the body portion into the through hole, and electrically contacts a second side of the printed circuit board at the land, the second side being opposite the first side.

2. The rechargeable battery pack of claim 1, wherein the connection member is integrally formed by cutting and bending a conductive plate.

3. The rechargeable battery pack of claim 1, wherein the guide portion and the supporting portion are formed as a pair and provided at two or three locations along a perimeter of the body portion.

4. The rechargeable battery pack of claim 3, wherein the guide portion is bent with a slope at a side of the body portion to elastically support the printed circuit board, and the supporting portion is perpendicularly bent at the side of the body portion and is in surface contact with the land of the printed circuit board.

5. The rechargeable battery pack of claim 1, wherein the first side of the printed circuit board is a lower side thereof, and the second side of the printed circuit board is an upper side thereof.

6. The rechargeable battery pack of claim 1, wherein the first side of the printed circuit board is an upper side thereof, and the second side of the printed circuit board is a lower side thereof.

7. The rechargeable battery pack of claim 1, wherein the through hole has a generally quadrangle shape, the printed circuit board further comprises a protrusion protruding from a side of the through hole toward a center of the through hole, and the body portion includes a groove extending along an insertion direction and corresponding to the protrusion.

8. The rechargeable battery pack of claim 1, wherein the body portion comprises;

inner and outer plates forming a double-layered portion by being bent in a circumference direction and extended in a length direction and respectively forming inner and outer sides of the double-layered portion;

a base plate at a side opposite the double-layered portion; and an elastic plate facing the inner plate by being bent inward from the base plate and closely attaching the inserted connection tab to the inner plate by elastically supporting the inserted connection tab.

9. The rechargeable battery pack of claim 8, wherein the elastic plate comprises:

a curved line portion connected in a curved line to the base plate and providing an elastic force;

an inclined portion bent with a slope to the curved line and inducing insertion of the connection tab; and a parallel portion bent from the inclined portion and extending in parallel with the inner plate.

10. The rechargeable battery pack of claim 9, wherein the parallel portion comprises a dimple convexly protruding toward the inner plate.

11. The rechargeable battery pack of claim 9, wherein the connection tab comprises a convex line convexly protruding toward the inner plate.

12. The rechargeable battery pack of claim 1, wherein the connection member is coupled to the printed circuit board in an inserted manner from above the printed circuit board, and the connection tab is coupled to the connection member in an inserted manner from below the printed circuit board.

13. The rechargeable battery pack of claim 1, wherein the connection member is coupled to the printed circuit board in an inserted manner from below the printed circuit board, and the connection tab is coupled to the connection member in an inserted manner from below the printed circuit board.

* * * * *